Nov. 21, 1967  E. M. DAVIDSON  3,354,244
METHOD AND APPARATUS FOR THE MANUFACTURE
OF FOAMED PLASTIC TUBING
Filed Aug. 13, 1964

EUGENE M. DAVIDSON
INVENTOR.

BY Browning, Simms
Hyer & Eickenroht
ATTORNEYS

Nov. 21, 1967    E. M. DAVIDSON    3,354,244
METHOD AND APPARATUS FOR THE MANUFACTURE
OF FOAMED PLASTIC TUBING
Filed Aug. 13, 1964    2 Sheets-Sheet 2
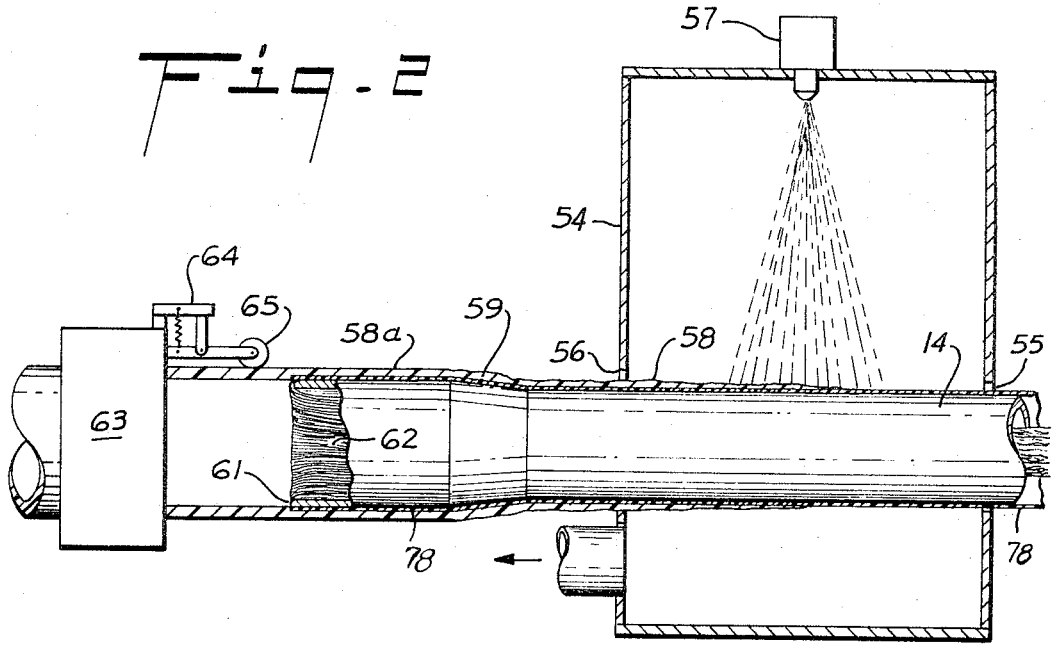
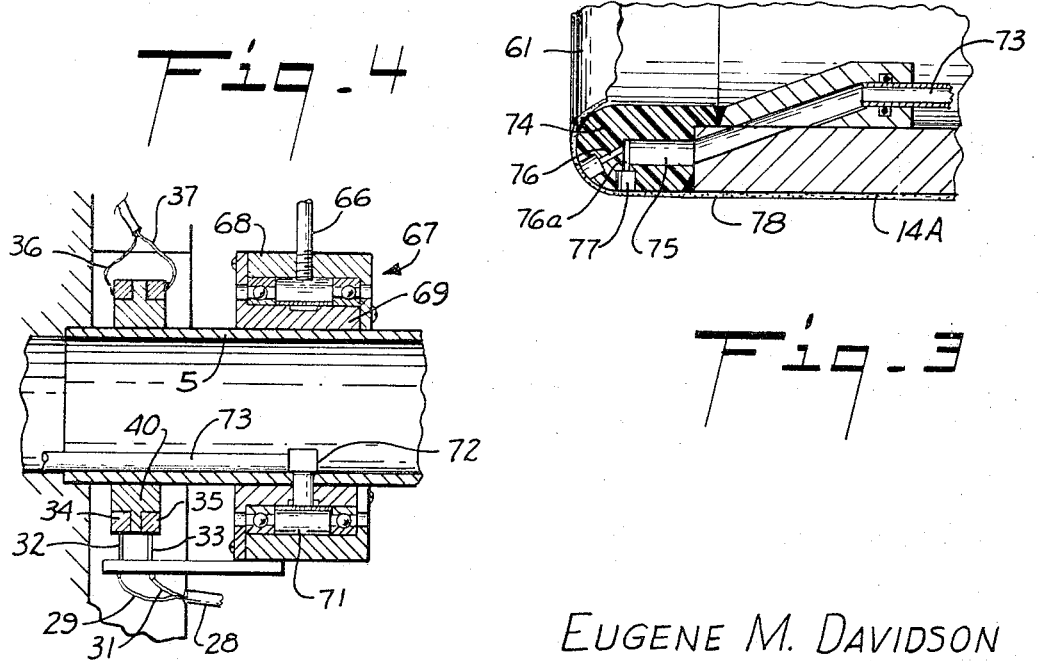
EUGENE M. DAVIDSON
INVENTOR.
BY Browning, Simms,
Hyer & Eisenroht
ATTORNEYS

United States Patent Office 3,354,244
Patented Nov. 21, 1967

3,354,244
METHOD AND APPARATUS FOR THE MANUFACTURE OF FOAMED PLASTIC TUBING
Eugene M. Davidson, Houston, Tex., assignor to Hudson Engineering Corporation, Houston, Tex., a corporation of Texas
Filed Aug. 13, 1964, Ser. No. 389,359
20 Claims. (Cl. 264—51)

ABSTRACT OF THE DISCLOSURE

A machine including a tubular mandrel which is rotated about its axis and means including a guide member rotatable with the mandrel for applying a continuous tubular sheet of thin parting plastic material about the outer surface of the mandrel. The sheet is advanced to one end of the mandrel and then pulled around such end and through the mandrel by rollers located adjacent its other end. A spray head adjacent the mandrel deposits a foaming pre-plastic mixture onto the outer surface of the parting sheet, and the mixture foams and cures in place to form a tube of foamed plastic. After the parting sheet is separated from the formed tube as it moves beyond the one end of the mandrel the tube is cut to desired lengths.

---

Figure 1:
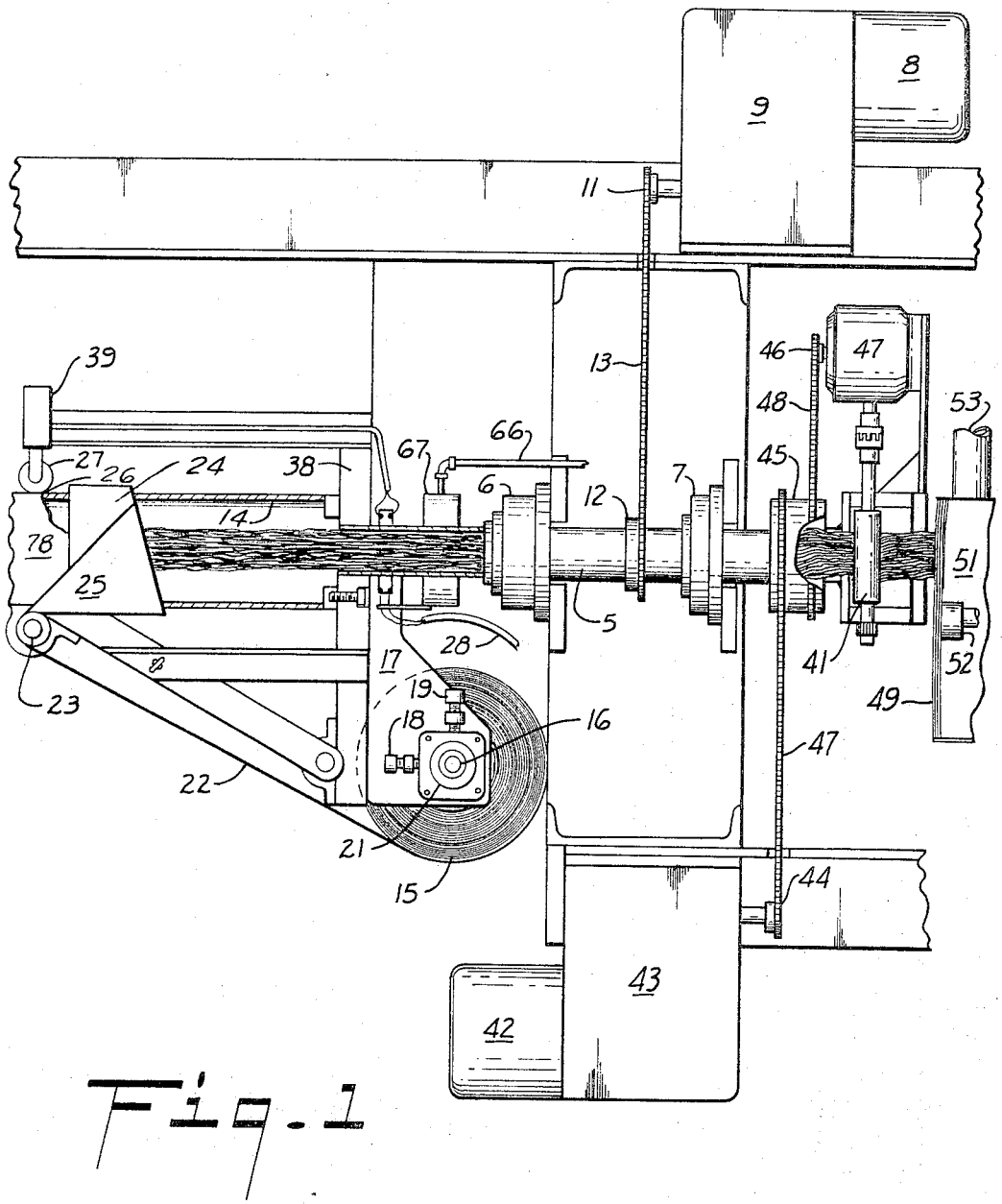

This invention relates to the art of making tubes of foamed plastic materials, such as polyvinyl, polyurethane, polystyrene or epoxy resin foams. It is particularly useful in producing tubes of foamed plastic material suitable for use as pipe insulation but is not limited to such use.

The production of tubes of foamed plastic resins for use in insulating piping has presented many problems. For example, tubes of foamed plastic have been cut into half cylindrical shape and applied as insulation upon piping in low temperature devices such as machines for liquefying gases. On exposure to sunlight and moisture, these half cylinders have had a tendency to warp, sag, wrinkle and spring apart so that atmospheric air has an opportunity to circulate between the piping and the insulation, thus destroying the effect of the insulation.

At present the most widely used insulation for low temperature piping in locations where it is exposed to atmospheric conditions is a glass foam produced by melting glass and blowing the melt with sulfur dioxide. Any foamed plastic material must be dimensionally stable and sufficiently low in cost that it can compete with foamed glass insulation if it is to be commercially acceptable as insulation of this type. It is we known that epoxy foams and the newer polyurethane foams have sufficient dimensional stability for such use if properly formed, but the raw materials for producing these foams are quite expensive, and if these foams are to be used at all the labor costs for producing the tubing must be very low. It is accordingly an object of this invention to provide an improved machine for the manufacture of tubes of foamed plastic material which is semi-automatic in operation and requires very little attention.

Another object is to provide a machine of the above type in which production may be maintained substantially continuously and at high rate.

Another object is to provide a machine for the manufacture of tubes of foamed plastic materials which permits free rise of the foam to produce a maximum volume of small closed cells in the foam.

Another object is to provide a machine of the above type in which even thickness of the wall of the tube is attained.

Another object is to provide an improved machine of the above type in which the interior of a tube formed thereon is smooth.

Another object is to provide an improved process for the manufacture of foamed plastic tubing in which free rise of a foaming pre-plastic mixture occurs.

Still another object is to provide a process of the above type which is effective to produce foamed plastic tubing having a smooth interior surface.

Other objects and advantages will become apparent to those skilled in the art from consideration of the following detailed description and of the drawings submitted herewith.

The machine of the present invention includes a tubular mandrel and a means associated therewith for applying a continuous tubular sheet of thin parting plastic around the outer surface of the mandrel. This means for applying parting plastic includes one or more spools of thin sheet plastic material, such as polyethylene, and a guide for each roll disposed to receive the sheet of plastic material unrolled from the roll and to guide the same longitudinally upon the outer surface of the tubular mandrel with the breadth of the sheet extending circumferentially around the mandrel. The sheet or sheets of parting plastic have sufficient breadth that their edges overlap and a sealing means, preferably a heated roller, is disposed at each overlap of the sheets so that after the edges are sealed together the sheet is tubular in shape.

A means, operatively connected to the mandrel, for maintaining a thin layer of fluid, preferably a compressed gas, between the tubular sheet of parting plastic and the outer surface of the mandrel, is provided, so that the sheet of the parting plastic is separated from the outer surface of the mandrel by a layer of fluid a few thousandths of an inch in thickness. A means for passing the tube of parting plastic continuously along the outer surface of the mandrel to an end thereof and preferably in reverse direction through the interior of the mandrel is provided. This means includes a set of rollers at a location where the tube of parting plastic is withdrawn from the machine adapted to apply sufficient pressure upon the parting plastic to draw it along the exterior of the mandrel and through the interior thereof to a point of exit. Preferably a shredding means, such as, for example, a set of knives of "lawnmower" type is located near this set of rollers so that the tube of parting plastic may be cut into shreds suitable to be picked up by a blower or other type of conveyor and be conveyed to waste.

The mandrel preferably extends through a chamber equipped with an exhaust for fumes at a location downstream from the sealing means with regard to the direction of travel of the parting plastic on the exterior surface of the mandrel and a means for depositing a layer of foaming pre-plastic mixture on the parting plastic is disposed downstream of the sealing means, preferably in the chamber mentioned above.

The term "foaming pre-plastic mixture" is used with this specification in restricted sense to mean a fluid mixture of a pre-plastic material or materials which polymerize or react to form a cured plastic under the influence of heat and/or a chemical curing agent, a material effective to generate a gas in the mixture, and optionally, a catalyst effective to decrease the time required to form a cured plastic. Since a great many formulae for such foaming pre-plastic mixtures are well known in the art and are readily obtainable from manufacturers of materials from which foamed plastics are made, and the present invention is not directed to any particular formula for a foaming pre-plastic mixture, the above definition is believed to describe useable mixtures sufficiently to be clearly understood by those skilled in the art.

The mandrel preferably tapers to a slightly enlarged diameter downstream of the means for depositing foaming pre-plastic material. The chemical reactions occurring in the foaming pre-plastic mixture are substantially always exothermic, and it is preferred that the tapered enlargement of the mandrel be located at a point where the maximum temperature is reached during cure of the foamed pre-plastic. The film of parting plastic, usually of polyethylene ordinarily has a quite different thermal coefficient expansion from the setting foamed pre-plastic and tends to expand and wrinkle, thus impressing matching wrinkles on the interior of the foamed pre-plastic tubing. Increase of the circumference of the mandrel at the point of maximum temperature results in stretching wrinkles out of the film of parting plastic and produces a smooth interior surface on the foamed pre-plastic tubing of desired final internal diameter.

The mandrel has sufficient length beyond this enlargement to permit the tube of foamed pre-plastic material to set before it passes beyond the end of the mandrel, and the sheet of parting plastic preferably is recurved around the end of the mandrel to travel in reverse direction through the interior thereof. The end of the mandrel thus serves as a means for separating the parting plastic from the tube of foamed plastic produced. A cutting means preferably is located adjacent the end of the mandrel from which the tube of foamed plastic passes so that the tube may be cut into suitable lengths as desired.

Either the mandrel or sprayheads for depositing the foaming pre-plastic mixture upon the tube of parting plastic are rotatable around the longitudinal axis of the mandrel. It is preferred, however, that the mandrel and means associated therewith rotate, as centrifugal force due to rotation of the mandrel aids in producing a tube of foamed plastic having walls of even thickness, and expensive joints for connecting rotating sprayheads to a supply of foaming pre-plastic material are eliminated. The mandrel may be arranged vertically, in inclined position, or horizontally but a substantially horizontal position of the mandrel is preferred because this position gives greater convenience in withdrawing the finished foamed plastic tube and the thin tube of parting plastic from the machine.

The process of the present invention includes the steps of moving a tubular sheet of parting plastic along its longitudinal axis, applying a layer of foaming pre-plastic mixture upon the tubular sheet of parting plastic, foaming and curing the mixture in place, preferably with free rise, and removing the resulting cured foamed plastic tubing from the parting plastic. Preferably the sheet of parting plastic and foamed plastic thereon is expanded radially while at the maximum temperature developed during cure of foamed pre-plastic sufficiently to eliminate any wrinkles in the parting plastic which may have been formed by uneven expansion of the parting plastic and foaming pre-plastic mixture.

It is believed that the invention may be best understood from consideration of the following detailed description and the attached drawings wherein FIGS. 1 and 2 together illustrate diagrammatically one preferred machine embodying principles of the present invention, FIG. 2 being an extension of FIG. 1 to the left in the drawings;

FIG. 3 is a detail of an end of the mandrel of FIG. 2 illustrating a preferred means for introducing a fluid between the mandrel and tube of parting plastic; and FIG. 4 is a detail illustrating preferred connections for compressed gas and electricity in the machine of FIGS. 1 and 2.

In the drawings the reference numeral 5 designates a hollow shaft mounted for rotation in bearings 6 and 7. The shaft is driven by a motor 8 through a conventional set of variable speed gearing indicated at 9, sprocket 11 driven by the variable drive, and a sprocket 12 on the shaft 5 and an endless chain 13. A tubular mandrel 14 is rigidly attached to and carried by shaft 5 and is arranged in axial alignment with the shaft. A spool 15 for a supply of thin sheet or film of parting plastic is carried by a supporting member 17 rigidly attached to the shaft 5 so that the supporting member 17 and spool 15 rotate with the shaft and mandrel.

Spool 15 is arranged to turn freely on shaft 16 which is journaled in a plate 21 adjustable in position to maintain proper alignment on the film by means of adjusting screws 18 and 19. A roller 23 is disposed to receive the thin strip of parting plastic 22 as it is unrolled from spool 15 and to feed the strip 22 to a guide member 24 which is arranged to guide the strip longitudinally upon the exterior of mandrel 14 so that the strip surrounds the mandrel 14 with its edges overlapping at the point 26. The thin strip of parting plastic is folded, as shown in 25 in FIG. 1, as it passes beneath an edge of guide member 24 disposed in fixed relationship with and surrounding the mandrel.

A heated roller 27 is disposed to roll upon and seal the overlapping edges of the strip 22 immediately after the strip emerges from beneath guide member 24. The flat strip 22 unrolled from spool 15 is thus formed into a tubular sheet or film 78 fitting closely upon the exterior 14A of mandrel 14. Electric power for heating the roller 27 is supplied by a cable 28 connected to a source of electric power (not shown) and containing conductors 29 and 31, best shown in FIG. 4, connected to stationary brushes 32 and 33 making contact with slip rings 34 and 35 carried upon and separated by an insulation member 40 rigidly attached to the exterior of shaft 5 and rotating therewith. Leads 36 and 37 preferably are soldered to opposite sides of the rings 34 and 35, respectively, and are supported by a common support 38 for the electric leads and roller support 39.

A means for advancing the tubular film 78 of parting plastic along the outside of mandrel 14 to an end thereof and in reversed direction through the interior of mandrel 14 and hollow shaft 5 is illustrated as a pair of rollers 41 disposed to grip the parting plastic at a point near that at which it emerges from the interior of shaft 5. These rollers are supported from and rotatable with shaft 5 and are driven by a motor 42 through a variable speed drive gear assembly indicated at 43, sprocket 44, and idler sprocket 45 freely rotatable upon the exterior of the shaft 5, sprocket 46, chains 47 and 48 connecting the sprockets and a right angle drive gear assembly indicated at 47.

It will be seen that the speed of travel of a point on the outer surface of the tubular sheet 78 of the parting plastic in a helical path around the exterior of mandrel 14 will thus be a function both of the speed of rotation of mandrel 14 and of the rollers 41. The provision of two variable drives therefore gives a considerable advantage in that the speeds of the rollers 41 and of mandrel 14 may vary independently of each other to obtain both desired speed of the mandrel in rotation and a desired speed of longitudinal travel of the tubular sheet of parting plastic along the exterior of the mandrel.

A means for shredding the sheet of parting plastic after it emerges from rollers 41 is illustrated as a set of knives 49 of "lawnmower" type through which the twisted tubular sheet passes after it emerges from the rollers 41. These are preferably located within a blower box 51, to which compressed air is fed by any suitable means illustrated at 52 and the resulting shredded parting plastic is passed by line 53 to waste or other disposal as desired.

The mandrel 14 extends through openings 55 and 56 in chamber 54 wherein any desired number of spray heads 57 are disposed to direct a spray of foaming pre-plastic mixture onto the tubular parting plastic on the mandrel.

When the foaming pre-plastic mixture is deposited upon the outside of the thin sheet 78 of parting plastic on mandrel 14 it begins to rise freely as shown at 58 to produce a tube of foamed plastic. The foamed plastic tube is carried to the left in FIG. 2 by travel of the sheet of parting plastic. At a distance from the chamber to permit development of maximum temperature in the foamed plastic deposited around the mandrel, the mandrel tapers at 59 to an enlarged diameter thus stretching the parting plastic sufficiently to eliminate any wrinkles that may have been formed therein and tube of foamed plastic to its final internal diameter and eliminating any wrinkles from the interior of the tube. The taper at 59 is exaggerated in the drawings for purposes of illustration. The tube of foamed plastic 58A is carried onward to the end 61 of mandrel 14, and because of the stiffness of the foamed plastic tube it continues to pass onward while the tubular plastic parting sheet is drawn in reverse direction back through mandrel 14 and shaft 5.

A means for cutting off the foamed plastic tube 58A at intervals is indicated at 63. This means may be any sort of cutting device desired but preferably is equipped with an actuating switch 64 to operate when specific increments of length of this tube have passed a roller 65. Many devices of this general type are on the market and any of them can be used in connection with the rotating mandrel.

It will be seen that a thin layer of parting plastic moving upon the outer surface of a rotating mandrel as shown and described above would be subject to a great deal of friction resulting in possibility of tearing the sheet especially at the end of the mandrel 61 where it reverses direction to travel back through the interior of the mandrel and drive shaft. A means for maintaining a thin layer of compressed gas between the sheet 78 of parting plastic and the outer surface 14A of the mandrel is illustrated as a line 66 connected to introduce compressed air from a source (not shown) into a rotary joint 67 best shown in FIG. 3. This rotary joint comprises an outer stationary housing 68 and inner band 69 connected to and rotating with shaft 5 providing an annular chamber 71 between the members 68 and 69. Shaft 5 is drilled to provide an opening, establishing communication between chamber 71 and a connection 72 inside shaft 5 for piping 73 carried within shaft 5 and mandrel 14.

The end 61 of mandrel 14 is preferably formed on an end piece 74 to reduce difficulties in manufacture. The end piece 74 has an annular chamber 75 formed therein which communicates with tubing 73, as best shown in FIG. 3. At intervals around the periphery of end piece 74 small conduits 76 and 76A are bored to communicate with chamber 75. Compressed air introduced through line 73 is thus directed between the outer surface 14A of mandrel 14 and the thin tubular sheet 78 of parting plastic so that the sheet of parting plastic floats upon a thin layer of compressed air a few thousandths of an inch in thickness. Floating the sheet of parting plastic in this manner eliminates substantially all objectional friction and eliminates the danger of tearing the sheet in normal operation and the rounded end 61 serves as a means for separating the parting plastic from the foamed plastic tube.

In operation the machine is started up by placing a supply of parting plastic on reel 15. This parting plastic is preferably a thin film or sheet 22 of polyethylene of about two-thousandths inch in thickness. The material is purchased in the form of flat ribbon-like sheet wound on reel 15. The sheet 22 of parting plastic is introduced manually into guide member 24 and is pulled into position on the mandrel with opposite edges of the sheet overlapping each other at the point 26. The roller 27 is heated electrically and the sheet is drawn over the mandrel to the left in FIGS. 1 and 2 until the entire mandrel is covered with a thin tubular sheet 78 and sufficient length has been passed beyond the end 61 of the mandrel to be manually introduced through the interior of the mandrel 14 and shaft 5, and between rollers 41.

The machine is then started in operation by rotating shaft 5 and mandrel 14 at a speed selected by the setting of variable speed drive 9 and the rollers 41 are operated at a speed selected by the setting of variable drive 43.

Air is introduced between the parting plastic and mandrel and a foaming pre-plastic mixture is then sprayed by sprayheads 57 onto the exterior of the parting plastic sheet 78, now floating on a thin layer of compressed air on the exterior of mandrel 14. As foaming occurs in the layer of deposited foaming pre-plastic mixture free rise is permitted since there is no pressure other than that of the atmosphere applied to the exterior of the layer of foaming mixture. When the tube of foamed plastic is at maximum temperature the tubular sheet 78 of parting plastic is stretched to eliminate any wrinkles that may have been formed by expansion of the sheet by passing over shoulder 59 on mandrel 14. The length of the mandrel from shoulder 59 to end 61 is selected so that the plastic will set and be sufficiently cured before it leaves the end 61 of the mandrel that it may be cut into pieces of desired length and stored or sent to any use desired. When the foamed plastic is to be used as pipe insulation, it is preferred that it be slit into half cylindrical shape by knives rather than by saws since a saw necessarily removes a part of the circumference of the circle and it is desirable that the two halves of the tube make a perfect circle when placed upon pipe as insulation therefor.

The sheet or film 78 of parting plastic passing around the rounded end 61 of the mandrel back through the interior of the mandrel and to rollers 41 is continually pulled by and flattened between rollers 41 thus pulling the parting plastic away from the inner walls of the mandrel and shaft 5 so that it does not drag excessively on the interior of the shaft it passes through the shaft to the rollers. As it emerges from rollers 41 it is shredded by knives 49 and blown from chamber 51 through line 53 to waste.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A process for the manufacture of tubes of foamed plastic material, comprising the steps of applying a continuous tubular sheet of thin parting plastic material around the outer surface of a mandrel; advancing the parting sheet longitudinally along the mandrel to one end thereof; depositing a foaming pre-plastic mixture upon the outer surface of the tubular sheet of parting plastic; foaming and curing the plastic in place; and cutting off the resulting tubes of foamed plastic material as they are advanced by the parting sheet beyond the one end of the mandrel.

2. The process of claim 1, wherein said mandrel is hollow, and the parting sheet is drawn back around said one end of the mandrel and through the mandrel as it advances beyond the one end thereof.

3. The process of claim 1, including the step of maintaining a thin layer of fluid between at least a portion of the mandrel and the parting sheet.

4. A process for the manufacture of tubes of foamed plastic material comprising the steps of applying a continuous tubular sheet of thin parting plastic material around the outer surface of a tubular mandrel; maintaining a thin layer of fluid between the sheet of parting plastic and the outer surface of the mandrel; advancing the sheet of parting plastic longitudinally along the mandrel to an end thereof and in reversed direction of travel through the interior of the mandrel; depositing a foaming pre-plastic mixture evenly upon the outer surface of the tubular sheet of parting plastic; foaming and curing the plastic in place; transporting the resulting tube of foamed cured plastic material beyond the end of the mandrel by travel of parting plastic thereon; and cutting off tubes of foamed plastic material extending beyond the end of said mandrel.

5. A process for the manufacture of foamed plastic tubing comprising the steps of moving a tubular sheet of parting plastic along its longitudinal axis; applying a foaming pre-plastic mixture upon the sheet of parting plastic; foaming the mixture with free rise and curing the resulting foamed plastic in place; and separating the cured foamed plastic tube from the parting plastic.

6. The process of claim 5 wherein the tubular sheet of parting plastic and foamed plastic in contact therewith is expanded radially while at the maximum temperature developed during cure of the foamed plastic.

7. A machine for producing tubes of foamed plastic material, comprising a mandrel adapted to receive a tubular sheet of thin plastic material about its outer surface, means for advancing the tubular sheet along the mandrel toward one end thereof, means for depositing a foaming pre-plastic mixture on the outer surface of the sheet as it advances along the mandrel so that it may rise and cure in place, and means for separating the sheet from the cured tube as said sheet passes said one end of the mandrel.

8. The machine of claim 7, wherein said mandrel is hollow, and said sheet separating means includes means for pulling the sheet around said one end and through the hollow mandrel.

9. The machine of claim 7, wherein the mandrel includes an enlarged portion between its one end and the mixture depositing means.

10. A machine for producing tubes of foamed plastic material, comprising a mandrel adapted to receive a tubular sheet of thin plastic material about its outer surface, means for advancing the tubular sheet along the mandrel toward one end thereof, means for depositing a foaming pre-plastic mixture on the outer surface of the sheet as it advances along the mandrel so that it may rise and cure in place, and means for rotating one of said mandrel and mixture depositing means relative to the other about the axis of the mandrel as the sheet advances therealong.

11. The machine of claim 10, wherein said mixture depositing means is fixed and said mandrel is rotated.

12. A machine for producing tubes of foamed plastic material comprising in combination a mandrel; means for applying a continuous tubular sheet of thin parting plastic material upon the outer surface of the mandrel; means, operatively connected to the mandrel for maintaining a thin layer of fluid between the tubular sheet of parting plastic and the outer surface of the mandrel; means for advancing the tubular sheet of parting plastic along the mandrel to an end thereof; means adjacent the mandrel for depositing a foaming pre-plastic mixture on the outer surface of the parting sheet; and means for separating the parting sheet from a resulting tube of foamed plastic adjacent said one end of the mandrel, one of said mandrel and means for depositing foaming pre-plastic being rotatable around the longitudinal axis of the mandrel.

13. The machine of claim 12 wherein the means for applying a continuous tubular sheet of thin parting plastic comprises a reel adapted to supply a continuous elongate ribbon of parting plastic of width greater than the circumference of said mandrel, a guide disposed around said mandrel to guide the sheet of plastic longitudinally upon the outer surface of the mandrel with opposite edges of the sheet overlapping thereon, and means for sealing overlapping edges of the parting plastic disposed adjacent said overlapping edges, said reel, guide, and sealing means being disposed in fixed relationship with corresponding points on the circumference of the mandrel.

14. A machine for producing tubes of foamed plastic material comprising in combination a tubular mandrel mounted for rotation around its longitudinal axis; means rotatable with the mandrel for applying a continuous thin tubular sheet of parting plastic material upon the outer surface of the mandrel; means for maintaining a thin layer of fluid between the sheet of parting plastic and the outer surface of the mandrel; means for advancing the tubular sheet of parting plastic along the mandrel to an end thereof and in reverse direction through the mandrel, and means disposed adjacent to the mandrel for depositing a foaming pre-plastic mixture on the outer surface of the parting sheet.

15. The machine of claim 14 wherein the mandrel extends through a chamber and the means for depositing a foaming pre-plastic mixture includes a sprayhead located in said chamber directed at the outer surface of said tubular sheet of parting plastic.

16. The machine of claim 14 wherein the mandrel tapers to enlarged diameter substantially at a point of maximum temperature in a tube of foamed plastic formed from the foaming pre-plastic mixture.

17. The machine of claim 14 in which the mandrel has a radially rounded end wall, and the means for cutting off lengths of foamed plastic tube is disposed beyond the rounded end wall of the mandrel.

18. The machine of claim 14 wherein the means for forming a continuous tubular sheet of parting plastic material upon the outer surface of the mandrel includes a dispensing reel for a sheet of parting plastic material rotatable with the mandrel, a guide rotatable with the mandrel disposed to guide the sheet longitudinally upon the mandrel in arcuate configuration thereon with the breadth of the sheet extending around the mandrel, the total width of said sheet being in excess of the circumference of the mandrel and providing overlapping edges, and sealing means adjacent to the mandrel disposed to seal said overlapping edges.

19. The machine of claim 14 wherein the means for maintaining a thin layer of fluid between the tubular sheet of parting plastic and the outer surface of the mandrel includes a supply line for fluid, a rotary joint including an outer member, an inner member rotatable with the mandrel cooperative with said outer member to form a chamber for fluid therebetween, the line connecting with the outer member to supply fluid to the chamber, piping carried upon an interior surface of said mandrel communicating with said chamber, an annular chamber in an end of the mandrel farthest downstream in the direction of travel of the tubular parting plastic on the exterior of the mandrel, and openings from said annular chamber to the exterior of said mandrel, the piping connecting with the last mentioned chamber.

20. The machine of claim 14 wherein the means for advancing the tubular sheet of parting plastic includes a pair of drive rollers located adjacent the end of the mandrel opposite said radially rounded end and a means for shredding withdrawn parting sheet is located downstream of said rollers.

References Cited

UNITED STATES PATENTS

| | | | |
|---|---|---|---|
| 2,135,763 | 11/1938 | Nicholson | 18—6 |
| 2,909,804 | 10/1959 | Means | 18—4 |
| 2,987,767 | 6/1961 | Berry et al. | 18—14 XR |
| 3,009,209 | 11/1961 | Weinbrenner et al. | 264—54 |
| 3,240,846 | 3/1966 | Voelker | 18—4 XR |

FOREIGN PATENTS

| | | |
|---|---|---|
| 1,302,293 | 7/1962 | France. |
| 913,685 | 12/1962 | Great Britain. |

ALEXANDER H. BRODMERKEL, *Primary Examiner.*

P. E. ANDERSON, *Assistant Examiner.*